(12) United States Patent
Duan et al.

(10) Patent No.: US 12,221,501 B2
(45) Date of Patent: Feb. 11, 2025

(54) SOLVENT-FREE ADHESION-PROMOTING CHAIN EXTENDER, PREPARATION METHOD THEREFOR, AND APPLICATION THEREOF

(71) Applicant: FINE-BLEND POLYMER (SHANGHAI) CO., LTD., Shanghai (CN)

(72) Inventors: Hao Duan, Shanghai (CN); Congshan Zhu, Shanghai (CN); Shengren Si, Shanghai (CN)

(73) Assignee: FINE-BLEND POLYMER (SHANGHAI) CO., LTD., Shanghai (CN)

( * ) Notice: Subject to any disclaimer, the term of this patent is extended or adjusted under 35 U.S.C. 154(b) by 449 days.

(21) Appl. No.: 17/678,432

(22) Filed: Feb. 23, 2022

(65) Prior Publication Data

US 2022/0177620 A1      Jun. 9, 2022

Related U.S. Application Data

(63) Continuation of application No. PCT/CN2020/097303, filed on Jun. 20, 2020.

(30) Foreign Application Priority Data

Apr. 17, 2020   (CN) .................. 202010307332.X

(51) Int. Cl.
    *C08F 212/08*     (2006.01)
    *C08G 63/91*      (2006.01)
(52) U.S. Cl.
    CPC .......... *C08F 212/08* (2013.01); *C08G 63/916* (2013.01)

(58) Field of Classification Search
    CPC ....... C08F 2/16; C08F 220/325; C08F 212/08
    See application file for complete search history.

(56) References Cited

U.S. PATENT DOCUMENTS

| 4,935,338 A * | 6/1990 | Masuda | G03C 1/04 |
|---|---|---|---|
| | | | 430/642 |
| 2012/0196997 A1 | 8/2012 | Lu et al. | |
| 2020/0172648 A1* | 6/2020 | Ahn | C08F 212/10 |

FOREIGN PATENT DOCUMENTS

| CN | 101157739 A | 4/2008 |
|---|---|---|
| CN | 102936307 A | 2/2013 |
| CN | 103881001 A | 6/2014 |
| CN | 107286697 A | 10/2017 |
| GB | 1530649 | * 10/1976 |

* cited by examiner

*Primary Examiner* — Robert C Boyle
(74) *Attorney, Agent, or Firm* — SZDC Law PC

(57) ABSTRACT

A solvent-free adhesion-promoting chain extender, a preparation method therefor, and an application thereof are disclosed. The method includes the following steps: mixing an aromatic vinyl monomer, an acrylate-based monomer, an initiator, and water, then heating the mixture for polymerization, and subjecting the product to a secondary reaction by a twin-screen extruder for granulation, to prepare the extender. The obtained epoxy functionalized chain extender can be applied to a recycled material of a polyester structure and can be used for the repair and growth of molecular chains of biobased and biodegradable plastics of a polyester structure. The method features no use of a solvent in a process route, low investment, easily available apparatuses, low emission in the process route, and simple process control; in addition, the product has stable composition and is easy to use, and thus can be widely used, such as medical treatment, packaging, home appliances, automobiles, and aviation.

5 Claims, 2 Drawing Sheets

SOLVENT-FREE ADHESION-PROMOTING CHAIN EXTENDER, PREPARATION METHOD THEREFOR, AND APPLICATION THEREOF

This application is a Continuation Application of PCT/CN2020/097303, filed on Jun. 20, 2020, which claims priority to Chinese Patent Application No. 202010307332.X, filed on Apr. 17, 2020, which is incorporated by reference for all purposes as if fully set forth herein.

TECHNICAL FIELD

The invention relates to a preparation method of an adhesion-promoting chain extender which can be used for recycling regenerated and degradable polyester and a preparation method thereof, and relates to the field of polymer materials.

BACKGROUND OF THE INVENTION

With the development of industrial and agricultural science and technology in modern society, the use of plastics has gradually applied into various fields of industrial and agricultural production. The "white revolution" that once brought good news to industrial and agricultural production greatly promoted the development of industrial and agricultural production, but also caused great "white pollution," "recycling of waste plastics" and "waste textiles" to the ecological environment. As a key development area, it can be seen that the polyester recycling market will further be expanded in the future.

In addition, with the support of relevant laws and regulations, the current global demand for biodegradable plastics is also showing a rapid growth trend. It is expected to reach 3.22 million tons by 2020, with an average annual growth rate of 16.7%. Among them, Europe has the largest demand, accounting for 31%, and North America and China account for 28% and 20% respectively. It can be seen that low-carbon, recycling, environmental protection, and sustainable development are the major themes and trends of world development. Plastic recycling, reuse and degradability will attract more and more attention and develop into a specific industry. In the plastic recycling technology, it is very important to restore the properties of the material and improve its functionality so that it can be processed and used multiple times. Chain extender is a key technology in the recycling process to turn waste into treasure and turn stones into gold. In the early days, the use of isocyanate chain extension was widely used in the synthesis of polylactic acid biodegradable polymer materials. Many di-heterocyclic compounds containing N and O can also be used in chain extension reactions, of which dioxazoline is the most common, mainly used for polymer chain extension with carboxyl groups at the end. So far, the research on chain extenders also includes epoxy functionalized polymers and maleic anhydride functionalized polymers. Among them, the development and application of epoxy functionalized polymer chain extenders has attracted the most attention.

The current focus of research and development of chain extenders is on epoxy functionalized polymers. Among them, the BASF ADR series product has been launched early, has good effects and a higher market share. However, the price of ADR is high, which has become an important factor restricting the development of the industry.

SUMMARY OF THE INVENTION

Technical Problem

The invention is realized through the following technical features:

The preparation method of the solvent-free adhesion-promoting chain extender includes the following steps: mixing an aromatic vinyl monomer, an acrylate monomer, an initiator, a molecular weight regulator and water, heating and polymerizing, and preparing a solvent-free adhesion-promoting chain extender.

Preferably, after the heating and polymerization is finished, the product is subjected to a double-screw secondary reaction granulation to prepare a solvent-free adhesion-promoting chain extender; a length-diameter ratio of the twin-screw extruder is not greater than 40. The double-screw extruder has a special screw combination design, and has multi-stage vacuum. Specifically, the preparation method of the polymer based on the solvent-free adhesion-promoting chain extender includes the following steps: mixing an aromatic vinyl monomer, an acrylate monomer, an initiator, a molecular weight regulator and water, heating and polymerizing, then carrying out a double-screw secondary reaction, extruding and granulating to prepare the solvent-free adhesion-promoting chain extender. The solvent-free adhesion-promoting chain extender overcomes the shortcomings in the prior art, is green, environmentally friendly, simple in process, desirable molecular weight, relatively narrow in molecular weight distribution, high in softening temperature and convenient to use, can be applied to recycled polycarbonate (PC), polyethylene terephthalate (PET), polybutylene terephthalate (PBT) and other polyester recycled materials, and can be applied to repair and growth of unused bio-based and biodegradable plastic molecular chains, such as polylactic acid (PLA), butylene adipate and butylene terephthalate (PBAT), polypropylene carbonate (PPC) and the like.

According to the invention, the preparation of the solvent-free adhesion-promoting chain extender is carried out in the absence of organic solvent, effectively solving the problem of organic solvent recovery treatment in the prior art. Meanwhile, through the double-screw secondary reaction, the residual single content is effectively reduced, and the reaction efficiency is further improved. For example, the prior art technology uses an organic solvent in an amount of 1.5-2 times that of a monomer, the reaction temperature is 110-120° C., and the molecular weight of the obtained chain extender is similar to that of Joncryl ADR product of BASF, and Mw is lower than 10000.

In the invention, a mass total of the aromatic vinyl monomer and the acrylate monomer is 100%, that is, a mass percentage of the monomer is 100%, and a mass percentage of the aromatic vinyl monomer is 76-99%, preferably 80-95%. The proportion of the raw materials has an important influence on the structure and performance of the chain extender, in particular, to the glass transition temperature and the molecular weight of the chain extender and the distribution of the molecular weight and the distribution of the chain extender. Thus, the application of the chain extender is influenced. It is well known that, due to the fact that the functionality of the chain extender is increased, the branching degree and the gel risk of the prepared product are also increased, the glass transition temperature of the existing epoxy-functionalized styrene acrylic copolymer chain extender is generally low, the processing temperature of the recycled polymer is above 230° C., and the processing temperature of the degradable base polymer exceeds 200° C. When the epoxy-functionalized styrene acrylic chain extender is added into the feeding area, the chain extender can generate an overreaction locally to form the gel, and the problems that the formula is uneven, and the production is unstable. The molecular weight distribution of the prepared chain extender is narrow, the glass transition temperature is high. Meanwhile, the molecular weight is high, and the reaction is mild. In addition, local gel is avoided, and production stability of the polymer is guaranteed.

In the invention, an amount of the molecular weight regulator is 0.1-3% of the mass of the monomer; an amount of the initiator is 0.1-2% of the mass of the monomer, preferably 0.1-1%. The mass of the monomer is a total mass of an aromatic vinyl monomer and an acrylate monomer.

Technical Solution

The invention provides an application of a solvent-free adhesion-promoting chain extender as a chain extender in preparation of a polymer, for example, the application of the solvent-free adhesion-promoting chain extender in the recovery of the polymer or the application of the solvent-free adhesion-promoting chain extender in the preparation of the degradable polymer, namely, the solvent-free adhesion-promoting chain extender can be used as a regenerated polymerization chain extender of the recycled polymer and a degradable polymer polymerization chain extender. Thus, the performance of the recycled material can be improved, and the recycled material can approach even more than the level of the new material.

The solvent-free adhesion-promoting chain extender is a random copolymer formed by copolymerizing an aromatic vinyl monomer and an acrylate monomer. In a preferred embodiment, the weight-average molecular weight of the adhesion-promoting chain extender is 30,000-150000, preferably 50000-100000. In another preferred embodiment, the density of the reactive functional groups in the adhesion-promoting chain extender is 0.5-0.8, and the multi-branching structure is easy to form.

The aromatic vinyl monomer can be a styrene monomer, such as a styrene monomer, an alpha-methyl styrene monomer, an alpha-chlorostyrene monomer or a P-methyl styrene monomer. The acrylate monomer can be glycidyl methacrylate and/or glycidyl methacrylate. The molecular weight regulator can be dodecyl mercaptan, and the initiator can be azobisisobutyronitrile (AIBN) or benzoyl peroxide (BPO).

In the solvent-free adhesion-promoting chain extender, the molecular chain contains a plurality of epoxy functional groups. When the molecular chain is polymerized with a polymer, such as polyester, the polyester molecular chain can be linked. The whole system is in a multi-branching state, so gel and other problems are avoided, In the invention, the temperature of the heating polymerization is 65-110° C., the reaction time is 2-10 hours. Preferably, the heating polymerization is conducted at 65-80° C. for 2-6 hours. Then the temperature is increased to 90-110° C., the reaction is continued for 0.5-2 hours, and then the product is obtained through the double-screw continuing secondary reaction. Compared with an existing suspension polymerization reaction, the reaction degree is further improved, the content of the residual monomer is greatly reduced, the obtained product is few in residual, narrow in molecular weight distribution, high in Tg, high in softening point and excellent in heat stability of the chain extender, and later processing and downstream use are facilitated.

Beneficial Effects

Compared with the prior art, the invention has the following beneficial effects:
1. The chain extender has high molecular weight and a plurality of reactive functional groups on a single molecular chain. The functional groups do not interfere with each other, and have high reaction activity. The chain extender significantly reduces the end-group concentration, improves the viscosity of the material, and is not prone to forming gel.
2. The reaction process is controllable, the reaction activity is high, the thermal stability is good, and makes it easy to obtain material with high intrinsic viscosity and high melt strength.
3. The process route does not need to use solvent, the investment is small, the equipment and the raw materials are easy to obtain, the process step is few, the mass ratio is simple, and the obtained composition is stable.
4. The chain extender disclosed by the invention has high molecular weight, is thermally stable, has a high softening point and is easy to feed. It is suitable for various processing technologies and conditions, and avoids the problem of softening and caking problems or equipment selectivity in the production process.
5. The monomer has the characteristics of no toxicity or low toxicity, the raw material monomer is easy to obtain, the process route can further improve the degree of polymerization, and the residual order is reduced. The method is suitable for high-end application related to medical instruments and food medicine packaging.
6. The chain extender has a wide application range: polyethylene terephthalate (PET), polybutylene terephthalate (PBT) and other polyester structural materials, and can be applied to the repair, growth and cross-linking of bio-based and biodegradable plastic molecular chains with polyester structures, such as polylactic acid (PLA), butylene adipate and butylene terephthalate (PBAT), polypropylene carbonate (PPC) and the like.
7. The chain extender disclosed by the invention is simple to use, can be widely applied to the fields of medical instruments, packaging, household appliances, automobiles, aviation and the like, and has very wide application prospects and industrial value.

BRIEF DESCRIPTION OF THE DRAWINGS

Other features, objects, and advantages of the present invention will become more apparent upon implementing the detailed description of non-limiting embodiments with reference to the following drawings.

EMBODIMENT OF THE INVENTION

Figure 1:
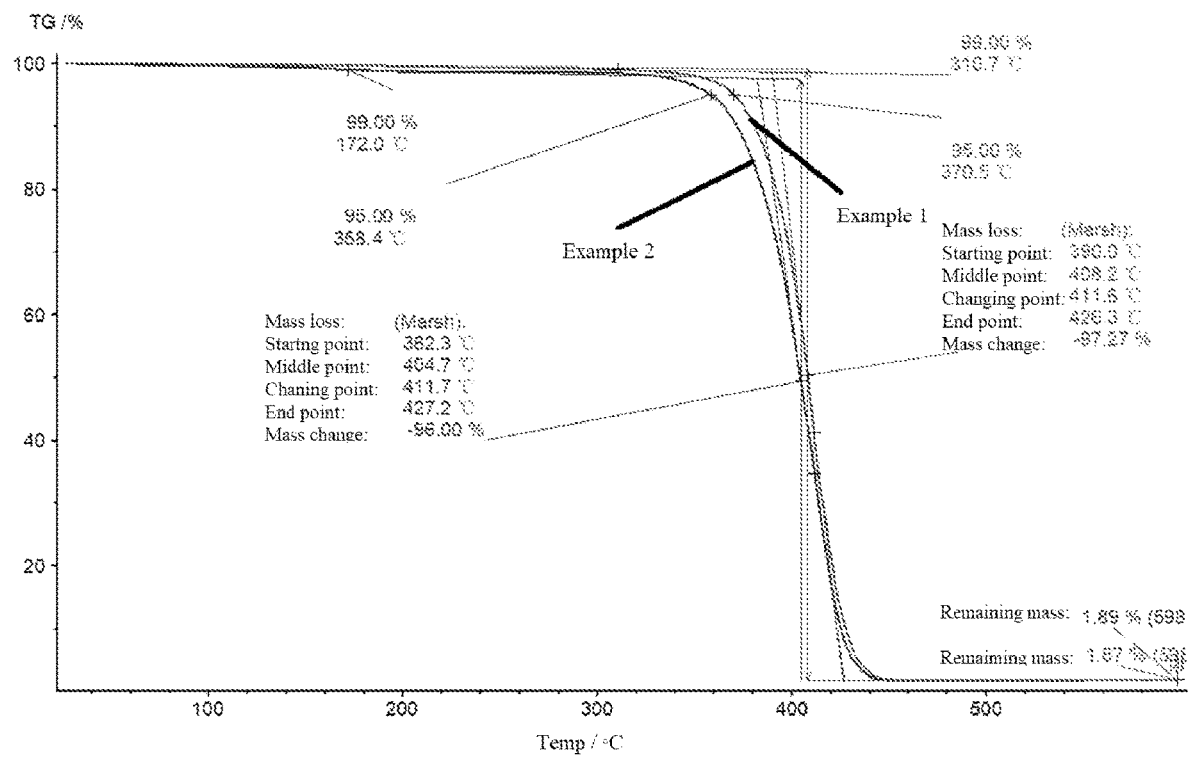
FIG. 1 is a TGA analysis comparison between Example 1 and Example 2.

The present invention will be described in detail below with reference to specific embodiments. The following examples will be helpful for a person skilled in the art to further understand the invention, but do not limit the invention in any form. It should be noted that a person of ordinary skill in the art can make several variations and improvements without departing from the concept of the present invention. These are all within the protection scope of the present invention.

The preparation method of the solvent-free adhesion-promoting chain extender includes the following steps:

Thermal weight loss is carried out according to ASTM D 6370-99, and TGA is used.

The reaction activity is tested according to ASTM D1652 standard.

Functional group density: the number of epoxy functional groups per 1000 molecular weight length molecular chain is obtained by combining molecular weight and molecular weight distribution.

TABLE 1

Compositions of Examples and Comparative Examples, Mass Percentage

| Materials | Ex. 1 | Ex. 2 | Ex. 3 | Ex. 4 | Ex. 5 | Com Ex. 1 | Com Ex. 2 | Com Ex. 3 | Com Ex. 4 | Com Ex. 5 | Com Ex. 7 |
|---|---|---|---|---|---|---|---|---|---|---|---|
| Styrene | 80 | 80 | 90 | 85 | 95 | 80 | 99 | 75 |  | 80 | 80 |
| GMA | 20 | 20 | 10 | 15 | 5 | 20 | 1 | 25 | 100 | 20 | 20 |
| Initiator | 0.4 | 0.4 | 0.8 | 0.6 | 0.9 | 0.4 | 0.4 | 0.4 | 0.4 | 0.4 | 0.4 |
| NW regulator | 0.7 | 0.7 | 0.1 | 0.3 | 0.1 | 0.7 | 0.7 | 0.7 | 0.7 | 0.7 | 0.7 |
| Process | (1) | (2) | (1) | (1) | (1) | (3) | (2) | (2) | (2) | (4) | (5) | putting an aromatic vinyl monomer, an acrylate monomer, an initiator, a molecular weight regulator and water into a reaction kettle, reacting at 65-80° C. under stirring for 2-8 hours, continuously reacting at 90-110° C. for 0.5-2 hours, discharging, filtering and drying to obtain the solvent-free adhesion-promoting chain extender; and carrying out secondary reaction granulation on the double-screw rod to obtain the solvent-free adhesion-promoting chain extender The preparation process does not need an organic solvent, does not need to be pressurized, and does not need special atmosphere protection.

The preparation method of the chain extender polyester polymer includes the following steps: mixing an aromatic vinyl monomer, an acrylate monomer, an initiator, a molecular weight regulator and water, heating and polymerizing to prepare a solvent-free adhesion-promoting chain extender; and mixing the polyester polymer raw material, the solvent-free adhesion-promoting chain extender and extruding to obtain a chain extender polyester polymer. Preferably, the amount of the solvent-free adhesion-promoting chain extender is 0.5-2% of the mass of the polyester polymer raw material. The polymer raw material can be pure particles or recycled plastic; can be applied to recycled polycarbonate (PC), polyethylene terephthalate (PET), polybutylene terephthalate (PBT) and other polyester recycled materials, and can be applied to repair and growth of unused bio-based and biodegradable plastic molecular chains such as polylactic acid (PLA), butylene adipate and butylene terephthalate (PBAT), polypropylene carbonate (PPC) and the like.

Test conditions are as follows

The weight average molecular weight (Mw): using PS as a standard sample, adopting GPC test; RTVM: testing according to ASTM D790 standard and adopting GC-MS.

The terminal carboxyl concentration is tested according to GB/T-14190-2008 and acid-base titration The melt index is tested according to ASTM D 1238 standard, and the test condition is 270° C.*2.16 Kg.

The intrinsic viscosity is tested according to the standard of GB/T-14190-2008.

The crystallinity is tested according to ASTM E793 standard, and DSC testing is adopted.

The glass transition temperature/Tg test is tested according to ASTM E 1356-98 standard, and DSC test is used.

Preparation process is as follows:

(1) Mixing styrene, glycidyl methacrylate GMA, an initiator azobisisobutyronitrile, a molecular weight regulator dodecyl mercaptan and 200 parts by mass of deionized water in a reaction kettle, reacting for 5 hours at 70° C. under conventional stirring, heating to 110° C., continuing to react for 2 hours, then discharging the obtained particles in a discharging groove, adding the obtained particles into a twin-screw extruder at 95° C., extruding and granulating at 190° C. to obtain the solvent-free adhesion-promoting chain extender. A long-diameter ratio of the twin-screw extruder is 35, and the double-screw extruder has multi-stage vacuum.

(2) Mixing styrene, GMA, initiator azobisisobutyronitrile, molecular weight regulator dodecyl mercaptan and 200 parts by mass of deionized water in a reaction kettle, reacting for 5 hours at 70° C. under conventional stirring, raising the temperature to 110° C., continuing to react for 2 hours, discharging in a discharging groove, carrying out conventional filtration, and drying the obtained particles at 95° C. to constant weight to obtain the solvent-free adhesion-promoting chain extender.

(3) Mixing styrene, GMA, an initiator azobisisobutyronitrile, a molecular weight regulator dodecyl mercaptan and 200 parts by mass of deionized water in a reaction kettle, reacting at 85° C. under conventional stirring for 7 hours, discharging the mixture in a discharging groove, carrying out conventional filtration, and drying the obtained particles at 95° C. to constant weight to obtain the solvent-free adhesion-promoting chain extender.

(4) Mixing styrene, GMA, initiator azobisisobutyronitrile, molecular weight regulator dodecyl mercaptan and 200 parts by mass of anhydrous toluene in a three-necked flask, reacting at 110° C. under conventional stirring for 5 hours, recovering a solvent, discharging, and drying the obtained particles at 95° C. to constant weight to obtain a solvent type adhesion-promoting chain extender.

(5) Mixing styrene, GMA, an initiator azobisisobutyronitrile and a molecular weight regulator dodecyl mercaptan into a three-necked bottle, vacuumizing, introducing nitrogen for protection, condensing under condensation at 80° C. for 2 hours, and reacting at 50° C. for 12 hours to obtain a chain extender.

The present application discloses that styrene and GMA are copolymerized to synthesize ST-GMA. The GMA group can preferentially react with the end group of the polyester material, especially the small molecule group generated by the degradation reaction is reacted, so that the effect of repairing the molecular chain is achieved, so that the material has good adhesion and chain extension effects on the returned polyester or the degradable polymer. Meanwhile, the mechanical property of the material can be improved; and in addition, the degradable polymer can also play a role in controlling the degradation speed. According to the conventional test conditions, the molecular weight (Mw) and residual monomer content (RTVM) of the control chain extender are tested according to the conventional test conditions, and the test results are shown in Table 2. The adhesion-promoting chain extender has high reaction activity and high Tg, wherein the epoxy functional group with the reactivity is located on the side chain, the intrinsic viscosity of the polyester material can be effectively improved, the end group concentration is reduced, and the fusion finger is reduced; and meanwhile, due to the molecular structure of the chain extender, the Tg and the crystallinity of the polyester material are also helped.

TABLE 2

Molecular Weight and Residual Monomer of Examples and Comparative Examples

| Materials | Ex. 1 | Ex. 2 | Ex. 3 | Ex. 4 | Ex. 5 | Com Ex. 1 | Com Ex. 2 | Com Ex. 3 | Com Ex. 4 | Com Ex. 5 | Com Ex. 7 |
|---|---|---|---|---|---|---|---|---|---|---|---|
| Nw/10,000 | 8 | 8 | 8.5 | 8 | 7.8 | 1 | 12 | 5 | 0.1 | 7.8 | 2.5 |
| Functional Group Density | 0.75 | 0.74 | 0.73 | 0.76 | 0.72 | 0.65 | 0.37 | 0.61 | / | 0.73 | 0.53 |
| Reactivity/% | 96 | 91 | 95 | 98 | 93 | 84 | 74 | 78 | 14 | 82 | 80 |
| RTVM (styrene/ppm) | 700 | 3670 | 820 | 720 | 790 | 4356 | 4710 | 3986 | / | 4000 | 4898 |
| RTVM (GMA/ppm) | 1000 | 3460 | 580 | 680 | 410 | 4080 | 1258 | 5380 | 5200 | 4231 | 5087 |
| Tg/° C. | 94 | 94 | 93 | 95 | 92 | 86 | 70 | 82 | / | 85 | 83 |

Examples 1-5 are compared to Comparative Examples 1-5, commercially available BASF ADR 4370 (Comparative example 6), and Comparative Example 7 as chain extender and recycled PET at 240° C., respectively, and pelletized by a high vacuum twin screw. Specifically, the chain extender and the recycled PET are added into a twin-screw extruder (the amount of the chain extender is 1% of the mass of recycled PET), and granulation is performed on the double-screw rod under the condition of 240° C. to obtain polymer particles; and the particle test end group concentration, the melt index (MI), the crystallinity, the glass transition temperature and the test result are shown in Table 3. The extrusion result shows that the comparative example has the phenomena of charging port aggregate, melt pressure change, strip breakage and the like, and are stable in melt pressure, few in feeding port and free of gel phenomenon when the chain extender is used for granulation. The chain extender of the present invention has a plurality of reactive functional groups on a single molecular chain, the reaction activity is high, the end group concentration of the material can be remarkably reduced, or the material can be degraded, and the thermal stability and viscosity of the material are improved.

TABLE 3

Comparison of the liquidity and appearance of the chain extension effect of examples and comparative examples on the recovery of PET

| Items | Terminal carboxyl Mmol/Kg | Melt Index (MI) 270° C. * 2.16 Kg | Crystallinity % | Glass transition temperature ° C. | Viscosity dL/g |
|---|---|---|---|---|---|
| Recycled PET | 31.1 | 156.78 | 22.55 | 80.46 | 0.584 |
| New PET | 25.2 | 74.68 | 24.82 | 81.34 | 0.642 |
| Example 1 | 13.7 | 39.6 | 24.88 | 83.38 | 0.907 |
| Example 2 | 15.87 | 52.7 | 23.48 | 81.99 | 0.705 |
| Example 3 | 16.7 | 47.3 | 26.43 | 82.32 | 0.878 |
| Example 4 | 12.82 | 41.2 | 26.73 | 83.86 | 0.910 |
| Example 5 | 17.7 | 58.6 | 25.24 | 83.22 | 0.866 |
| Com. Ex. 1 | 22.7 | 68.6 | 23.24 | 80.12 | 0.686 |
| Com. Ex. 2 | 22.0 | 20.7 | 25.30 | 81.16 | 0.548 |
| Com. Ex. 3 | 22.8 | 76.7 | 25.52 | 81.27 | 0.622 |
| Com. Ex. 4 | 13.2 | 94.68 | 22.90 | 76.40 | 0.536 |
| Com. Ex. 5 | 19.98 | 65.7 | 23.18 | 80.67 | 0.623 |

TABLE 3-continued

Comparison of the liquidity and appearance of the chain extension effect of examples and comparative examples on the recovery of PET

| Items | Terminal carboxyl Mmol/Kg | Melt Index (MI) 270° C. * 2.16 Kg | Crystallinity % | Glass transition temperature ° C. | Viscosity dL/g |
|---|---|---|---|---|---|
| Com. Ex. 6 | 14.2 | 30.5 | 23.55 | 81.73 | 0.751 |
| Com. Ex. 7 | 19.76 | 65.4 | 22.38 | 80.52 | 0.619 |

As shown in Table 2, the molecular weight of the chain extender is close to the density of the functional groups when comparing example 1 with comparative example 5 and comparative example 7, but the difference of the reaction activity measurement data is large, and the process is combined with the RTVM test result.

The obtained chain extender is more complete in reaction degree, has the advantages that the reaction activity is greatly improved, and as shown in FIG. 1, the thermal stability of the chain extender is improved, and later processing and downstream use are facilitated. The chain extension effect of the sample of Comparative Example 5 and Comparative example 7 is also significantly less than that of Example 1. This is because the residual GMA of the small molecule will preferentially react with the end group of the polyester. Although the end group concentration of the return polyester is decreased, the reaction does not increase the viscosity.

As shown in Table 1 to Table 3, the chain extender has a relationship with a molecular weight, a GMA concentration, a residual monomer amount of GMA, a reaction condition, etc. Although the content of GMA is the same as that in Comparative Example 1, the content of GMA is different, and the difference of functional groups density is different, thereby affecting the reaction activity. The chain extension effect of Examples 1-2 is more obvious, and the terminal carboxyl concentration is lower. Tt can be seen that the appropriate molecular weight facilitates the chain extension reaction.

The content of GMA is different. For example, the density of GMA is too low, the density of GMA is low, the reaction activity is low, the chain extension effect is poor, as the content of GMA is increased, the chain extension effect is poor, but not linear growth, the appropriate GMA density is more important (as in Example 1 and Example 4), the chain extension effect of Example 4 is further superior to that of Example 1. When the GMA content is too high (as for Example 3 and 4), the effect is negative.

Figure 2:
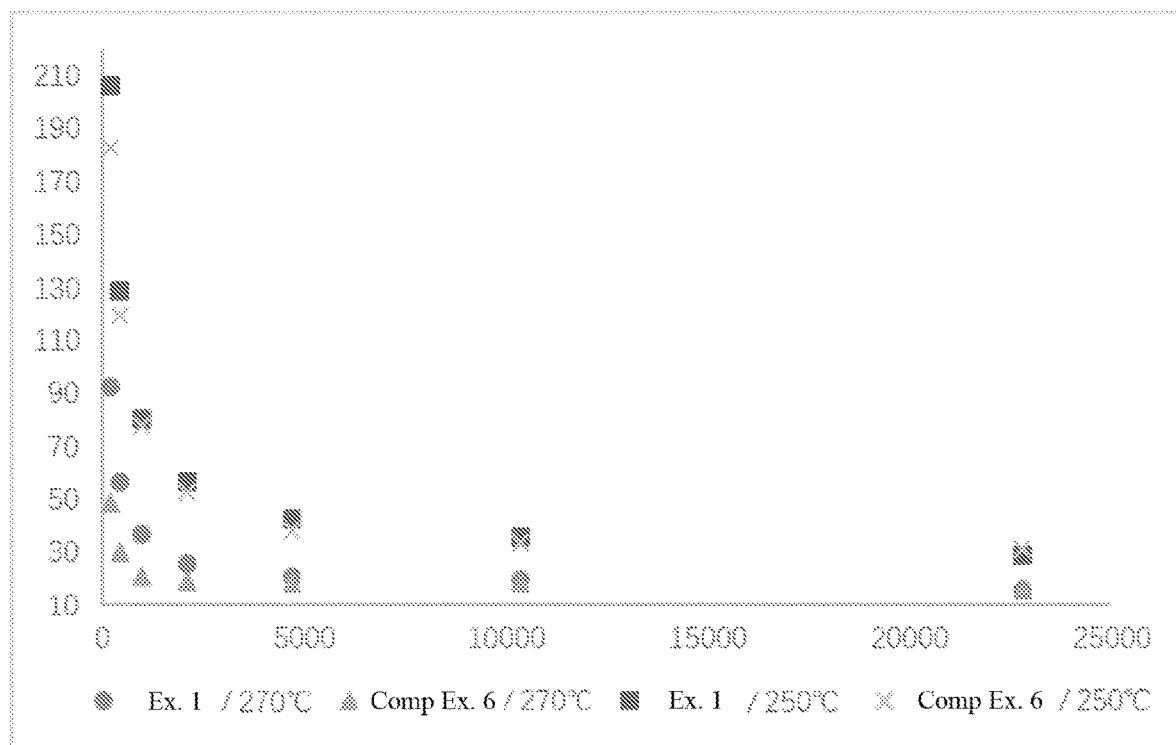
FIG. 2 is a capillary rheological data comparison of Example 1 and Comparative Example 6 at 250° C. and 270° C.

In combination with the data of FIG. 2 and Table 1 to Table 3, compared with Comparative Example 6, the terminal carboxyl concentration and MI of the Example 1 are relatively close, but the characteristic viscosity increase of the Example 1 is more obvious, and the combined crystallinity and the glass transition temperature are also more advantageous, which has a certain relationship with the own molecular weight of the Example 1. In particular, the glass transition temperature of the recycled PET with the chain extender of the comparative example 6 is obviously low. It can be seen that the design of the molecular structure of the chain extender also influences the production of the recycled polyester and the degradable polyester.

In FIG. 2, the viscosity of the same type of degradable polyester material is observed in the capillary rheometer in a direct blending manner, and analysis is performed. Under the condition of 250° C., the shear viscosity of Example 1 and Comparative Example 6 is close, but the shear viscosity of Comparative Example 6 is significantly reduced when the processing temperature is raised to 270° C.

The specific embodiments of the present invention are described above. It should be understood that the present invention is not limited to the specific embodiments described above, and various changes or modifications can be made by a person skilled in the art within the scope of the claims, which does not affect the essence of the present invention.

Compared with the prior art, the chain extender has the following beneficial effects: 1, The chain extender has high molecular weight and a plurality of reactive functional groups on a single molecular chain. The functional groups do not interfere with each other, and have high reaction activity. The chain extender significantly reduces the end-group concentration, improves the viscosity of the material, and is not prone to forming gel. 2, The reaction process is controllable, the reaction activity is high, the thermal stability is good, and makes it easy to obtain material with high intrinsic viscosity and high melt strength. 3, The process route does not need to use solvent, the investment is small, the equipment and the raw materials are easy to obtain, the process step is few, the mass ratio is simple, and the obtained composition is stable. 4, The chain extender disclosed by the invention has high molecular weight, is thermally stable, has a high softening point and is easy to feed. It is suitable for various processing technologies and conditions, and avoids the problem of softening and caking problems or equipment selectivity in the production process. 5, The monomer has the characteristics of no toxicity or low toxicity, the raw material monomer is easy to obtain, the process route can further improve the degree of polymerization, and the residual order is reduced. The method is suitable for high-end application related to medical instruments and food medicine packaging.

According to the invention, the technical progress and the green production of the technical field of the leading collar can be smoothly implemented, the supporting capability and the innovation capability of the circulating economic technology are improved, and a positive pushing effect is achieved in the development of fine refining and high-added-value direction development in the chemical industry. Meanwhile, the technical scheme of the invention is a synthetic line capable of realizing industrial production, environmental protection and high yield.

The invention claimed is:

1. A solvent-free adhesion-promoting chain extender, wherein the solvent-free adhesion-promoting chain extender is prepared by a method consisting of the following steps:
   mixing a mixture consisting of an aromatic vinyl monomer, an acrylate monomer, an initiator, a molecular weight regulator and water,
   heating and polymerizing to prepare the solvent-free adhesion-promoting chain extender;

when a mass percentage of the aromatic vinyl monomer and the acrylate monomer is 100%, a mass percentage of the aromatic vinyl monomer is 76-99%, wherein a temperature of the heating and polymerizing is 65-110° C., and a reaction time is 2-10 hours, wherein the heating and polymerizing is performed at 65-80° C. for 2-6 hours, and then at 90-110° C. for 0.5-2 hours, and wherein after the heating and polymerizing is completed, the solvent-free adhesion-promoting chain extender is subjected to a double-screw secondary reaction granulation.

2. The solvent-free adhesion-promoting chain extender according to claim 1, wherein when a mass percentage of the aromatic vinyl monomer and the acrylate monomer is 100%, a mass percentage of the aromatic vinyl monomer is 80-95%; an amount of the initiator is 0.1-2% of the mass of the aromatic vinyl monomer; and a weight average molecular weight of the solvent-free adhesion-promoting chain extender is 30,000-150,000.

3. The solvent-free adhesion-promoting chain extender according to claim 2, wherein the amount of the initiator is 0.1-1% of the mass of the aromatic vinyl monomer; and the weight average molecular weight of the solvent-free adhesion-promoting chain extender is 50,000-100,000.

4. The solvent-free adhesion-promoting chain extender according to claim 1, wherein the adhesion-promoting chain extender has a multi-branched structure, and a functional group having a reactivity is located on a side chain thereof.

5. The solvent-free adhesion-promoting chain extender according to claim 1, wherein the aromatic vinyl monomer is a styrene monomer, an alpha-methyl styrene monomer, an alpha-chlorostyrene monomer, or a P-methyl styrene monomer; the acrylate monomer is glycidyl methacrylate, or glycidyl methacrylate; the molecular weight regulator is dodecyl mercaptan; and the initiator is azobisisobutyronitrile (AIBN) or benzoyl peroxide (BPO).

* * * * *